United States Patent [19]

Vogt

[11] Patent Number: 5,952,413
[45] Date of Patent: Sep. 14, 1999

[54] METHOD OF MAKING A POLYURETHANE SUEDE-LIKE FABRIC/ELASTOMER COMPOSITE

[75] Inventor: Kirkland W. Vogt, Simpsonville, S.C.

[73] Assignee: Milliken & Company, Spartanburg, S.C.

[21] Appl. No.: 09/245,675

[22] Filed: Feb. 8, 1999

Related U.S. Application Data

[63] Continuation of application No. 09/042,922, Mar. 17, 1998.

[51] Int. Cl.[6] .............................. C08G 18/00; C08L 75/04
[52] U.S. Cl. ........................ 524/306; 524/315; 524/591; 524/773; 524/839; 524/840; 528/48; 528/71; 528/80
[58] Field of Search ..................................... 524/306, 315, 524/591, 773, 839, 840; 528/48, 71, 80

[56] References Cited

U.S. PATENT DOCUMENTS

| | | | |
|---|---|---|---|
| 3,100,721 | 8/1963 | Holden | 117/135.5 |
| 3,208,875 | 9/1965 | Holden | 117/135.5 |
| 3,228,786 | 1/1966 | Fitzgerald et al. | 117/62 |
| 3,412,054 | 11/1968 | Milligan et al. | 260/18 |
| 3,480,592 | 11/1969 | Dieterich et al. | 260/77.5 |
| 3,565,844 | 2/1971 | Grace et al. | 260/29.2 |
| 3,695,924 | 10/1972 | Wagner | 117/76 T |
| 3,705,226 | 12/1972 | Okamoto et al. | 264/162 |
| 3,706,613 | 12/1972 | Tochi et al. | 156/85 |
| 3,708,333 | 1/1973 | Carlson | 117/140 A |
| 3,969,551 | 7/1976 | Ellsworth | 427/282 |
| 4,035,213 | 7/1977 | Thoma et al. | 156/231 |
| 4,046,729 | 9/1977 | Scriven et al. | 260/29.2 TN |
| 4,094,847 | 6/1978 | Huffman et al. | 260/29.4 R |
| 4,137,209 | 1/1979 | Wong et al. | 260/26.6 NR |
| 4,171,391 | 10/1979 | Parker | 427/246 |
| 4,203,883 | 5/1980 | Hangauer, Jr. | 260/29.2 TN |
| 4,233,359 | 11/1980 | Mimura et al. | 428/254 |
| 4,277,380 | 7/1981 | Williams et al. | 260/18 TN |
| 4,299,868 | 11/1981 | Berndt et al. | 427/389.9 |
| 4,332,710 | 6/1982 | McCartney | 524/591 |
| 4,336,300 | 6/1982 | Lóránt et al. | 428/316.6 |
| 4,420,507 | 12/1983 | Marco | 427/170 |
| 4,452,834 | 6/1984 | Nachtkamp et al. | 427/379 |
| 4,632,960 | 12/1986 | Sato et al. | 525/117 |
| 4,657,957 | 4/1987 | Baumann et al. | 524/245 |
| 4,833,173 | 5/1989 | Spek et al. | 521/72 |
| 4,886,702 | 12/1989 | Spek et al. | 428/308.4 |

FOREIGN PATENT DOCUMENTS

| | | |
|---|---|---|
| 2109171 | 9/1972 | Germany . |
| 2837314 | 3/1979 | Germany . |
| 47-3477 | 1/1972 | Japan . |
| 48-004940 | 2/1973 | Japan . |
| 48-004941 | 2/1973 | Japan . |
| 52-77292 | 6/1977 | Japan . |
| 2093051 | 8/1982 | United Kingdom . |

*Primary Examiner*—Erma Cameron
*Attorney, Agent, or Firm*—Terry T. Moyer; William S. Parks

[57] ABSTRACT

A process for the production of a fabric/elastomer composite is provided. The inventive process involves the impregnation of an inventive elastomer composition comprising (i) a water-borne polyurethane latex, (ii) an acid-generating chemical, and (iii) a cloud point surfactant, within a textile fabric. Subsequently, the impregnated fabric is then heated, preferably with steam, in order to generate an acid and gel the surfactant which then uniformly coagulates the latex over the fabric surface. The fabric is preferably comprised of polyester fibers. The composite may be utilized as upholstery in furniture or in automobiles, apparel, drapery, and the like. The inventive elastomer composition is also provided.

4 Claims, No Drawings

METHOD OF MAKING A POLYURETHANE SUEDE-LIKE FABRIC/ELASTOMER COMPOSITE

CROSS REFERENCE TO RELATED APPLICATIONS

This application is a continuation of co-pending application Ser. No. 09/042,922, filed on Mar. 17, 1998. This parent application is herein entirely incorporated by reference.

FIELD OF THE INVENTION

This invention relates to a process for producing a fabric material having the appearance and feel of suede. The inventive procedure involves producing an elastomer composition of at least three ingredients: a polyurethane latex, an acid-generating chemical, and a cloud-point surfactant; applying the mixture to a porous textile substrate, heating the impregnated fabric until the elastomer coagulates over the fabric substrate, and drying the resultant composite without destroying the coagulated structure. The resultant composite obtains an excellent suede-like finish. The three ingredient pre-mixture is a long-lasting shelf-stable (long pot-life) composition which will not react until it is exposed to sufficient amounts of heat, thus providing a cost-effective improvement over the prior art. The particular produced composites are also contemplated within this invention.

DISCUSSION OF THE PRIOR ART

Polyurethane latices have been utilized in a variety of ways, most notably as coatings or finishes on fabric surfaces. Such latices provide, for example, a barrier to potentially damaging environmental conditions. Furthermore, leather substitutes have been produced through the use of polyurethane latices, also. Polyurethane suede-like finishes provide a substitute to more expensive, actual leather articles. Such a leather substitute must have the feel and texture of suede, as well as be able to withstand heavy use in, as merely examples, automotive and furniture upholstery.

Past polyurethane suede-like products included composites produced through the reaction of a polyurethane latex and an acid-generating chemical, and specifically hydrofluorosilicic salts. Such a composition is disclosed within U.S. Pat. No. 4,332,710, to McCartney, entirely incorporated herein by reference. Patentee teaches heat-activated coagulation of a polyurethane latex solely in conjunction with an acid-generating chemical, such as salts of hydrofluorosilicic acid. Such a composition and method presents some difficulties, primarily in the use of an acid-generating chemical alone to provide ionic coagulation. This two-component system oftentimes results in a non-uniform distribution in the substrate textile and thus can form stringy structures which are unattractive as suede substitutes. Of particular concern are the environmental and safety issues related to the use of hydrofluorosilicic acid salts which are highly discouraged but which are the preferred and, in actuality, only acid-generating chemicals disclosed within patentee's teachings.

Other prior teachings involving polyurethane latex heat-activated coagulation include U.S. Pat. No. 4,886,702, to Spek et al. This patent discloses a method utilizing a composition comprising a waterborne polymer latex, including polyurethane, a cloud point surfactant coagulant, and a foaming agent. However, first of all, such a composition cannot produce suede-like textile products due to the harsh hand resulting from the required foaming effect. Second, the foaming agent is freon, which is being phased out of production due to its deleterious environmental impact. Third, the coagulation process requires acid and/or salt compounds within the composition which potentially creates a coagulant prior to contact with a substrate and which results in a non-uniform dispersion on a substrate surface. Last, the shelf life (or pot life) or patentee's compositions is, at a maximum, only eight hours in duration.

Furthermore, U.S. Pat. No. 4,171,391, to Parker, teaches polyurethane latex coagulation within an aqueous ionic or acid bath. Such a procedure is very difficult to control as the type and amount of ionic material or acid, and thus the rate of diffusion of such a constituent from the bath to the substrate material, is the determining factor. As a result, there is a lack of consistent uniformity of dispersion and coagulation from one textile substrate to another. Particularly concerning heavier fabric substrates, the necessary contact times may be as high as 30 minutes, which translates into high costs for the manufacturer and, ultimately, the consumer.

There is a need, then, for improved suede-like fabric/elastomer composites within the industry which are relatively inexpensive to make, which utilize environmentally safe compounds and chemicals within their manufacture, and which obtain a more realistic appearance and an overall better performance over others of the prior art.

DESCRIPTION OF THE INVENTION

It is thus an object of the invention to provide such an improved, more aesthetically pleasing suede-like fabric/elastomer composite. A further object of the invention is to provide a relatively inexpensive method of making such a composite, primarily by providing an elastomer with a shelf-life of at least two weeks. Another object of the invention is to provide a method of producing a suede-like article which includes environmentally safe, nontoxic, low odor, noncombustible chemicals. Yet another object of this invention is to provide suede-like composites within all intended uses in which a user requires or desires such a leather substitute.

Accordingly, this invention concerns a method of making a polyurethane suede-like fabric/elastomer composite comprising the sequential steps of
 (a) providing a textile fabric;
 (b) impregnating said fabric with an elastomer composition comprising
  (i) a water-borne polyurethane latex;
  (ii) a heat-activated acid-generating chemical selected from the group consisting essentially of at least one organic acid ester; and
  (iii) a cloud point surfactant; and
 (c) heating said impregnated textile to a temperature to effectuate a uniform dispersion and coagulation of said elastomer composition over said textile fabric. Also, the invention concerns the elastomer composition of step (b) of the inventive method, itself.

Nowhere within the prior art has such a specific heat-activated coagulating method utilizing an elastomer composition of a polyurethane latex, an acid-generating compound from such a specific group of such materials, and a cloud point surfactant been disclosed, practiced, or fairly suggested. Such an elastomer composition provides a significant advantage over the two-component (latex and acid-generator) and different three-component (latex, cloud point surfactant, and foaming agent) compositions of the prior art. For instance, the inventive composition has a shelf life (pot life) measured in weeks (at least two weeks of stability and non-coagulation after initial admixing) instead of hours at a temperature as high as about 38° C. (100° F.). The coagulation occurs only after exposure to a heat source of sufficient temperature to effectuate such reactivity (greater than about 82° C. or 180° F.). Furthermore, another improvement over the prior art is the use of only environmentally "friendly" materials throughout the inventive process. For instance, the acid-generating chemicals within the inventive coating composition do not include potentially unsafe hydrofluorosilicic acid salts, but utilize relatively safe organic acid esters. Additionally, the utilization of the cloud point surfactant and the acid-generating chemical facilitates production through the ability to control more effectively the rate and uniformity of the coagulation process. The prior art teachings do not permit such an extensive and beneficial ability to control such reactions. In particular, the inventive method and composition provide a high level of coagulant uniformity within single composite substrates and also allow for uniformity of appearance and performance between many different composites at the large-scale manufacturing level. Yet another improvement available with the inventive method and composition is the use of a strictly aqueous system rather than an organic solvent-based system. Avoidance of organic materials provides less volatility, odor, combustibility, and toxicity as well as increased heat stability for the final product. Of particular interest is the beneficial ability of the inventive composition (being an aqueous system) to be utilized in conjunction with other compatible aqueous chemical systems used in other areas of textile manufacturing. Such adaptability and combinability with other textile manufacturing procedures and materials is a very important benefit, again to reduce the chances of toxic emissions, etc., during textile processing. Finally, the inventive method and composition impart a soft, fine-structured coagulum suede-like finish to fabrics which is comparable to, if not better than, suede-like finishes produced with organic solvent-borne systems (such as in U.S. Pat. No. 4,886,702, noted above). Thus, the inventive method and composition provide the means to produce, in a very safe manner, a fabric/elastomer composite having a desirable hand and feel which effectively simulates an actual suede article.

The term fabric/elastomer composite means an article comprised of a textile fabric which has been coated with an elastomer composition. As noted above, the inventive elastomer composition comprises three materials, a water-borne polyurethane latex, an acid-generating chemical , and a cloud point surfactant. Any water-borne polyurethane latex may be used; however, the preferred latices are those having at least a 40% solids content, with greater than 50% solids content being more preferred, and higher than 65% being the most preferred. One preferred example of such a latex is Witcobond W-293 (67% solids) polyurethane latex, available from Witco. The water-borne criteria is of utmost importance within this invention primarily to insure that potentially environmentally harmful organic solvents are not present within the elastomer composition.

The term heat-activated acid-generating compound denotes a chemical which is not an acid at room temperature, but which, upon exposure to a heat source, produces an acid. The particularly suitable class of compounds which both meet this description and provide the best results with little or no deleterious environmental impact are organic acid esters. Some specific types of such compounds include ethylene glycol diacetate, ethylene glycol formate, diethylene glycol formate, triethyl citrate, monostearyl citrate, a proprietary organic acid ester available from High Point Chemical Corporation under the tradename Hipochem AG-45, and the like. The preferred species is ethylene glycol diacetate, available from Applied Textile Technologies as APTEX™ Donor H-plus.

The term cloud point surfactant is intended to encompass any surface-active agent which, upon exposure to higher temperatures, becomes less water soluble. Such a surfactant easily binds with the polyurethane latex upon gelling and facilitates the uniform coagulation of the latex over the entire contacted textile substrate. Specific surfactants meeting such a limitation include poly(ethylene) oxides, poly (ethylene/propylene) oxides, polythio ethers, polyacetals, polyvinylalkyl ethers, organopolysiloxanes, polyalkoxylated amines, or any derivatives of these listed compounds, with the preferred being polyalkoxylated amines, available from Clariant under the tradename Cartafix U™.

The proportions required within the inventive elastomer composition are based upon the ratio of weights between the latex and each of the remaining components. For instance, the polyurethane must have water present in order for the inventive method to function properly. It has been found that a weight ratio of latex to water of from about 1:30 to about 3:1 provides sufficient moisture within the reaction itself to commence a suitable fabric treatment. Furthermore, weight ratios of form 40:1 to about 100:1, and preferred ranges of from about 40:1 to about 50:1, are suitable between the latex and each of the individual remaining components, namely the acid-generator and the cloud point surfactant. The Examples below further illustrate the importance of such ranges of weight ratios.

The textile fabric utilized within the inventive process may comprise any synthetic or natural fiber or blend of such fibers. As merely examples, and not intended as limitations, the textile fabric may be constructed from fibers of polyester, nylon (–6 or –6,6), cotton, polyester/cotton blends, wool, ramie, lycra, and the like. The preferred substrate is made of polyester, and most preferably polyethylene terephthalate yarns. Also, the textile fabric may be of woven, non-woven, or knit construction with a knit fabric being the preferred type.

The impregnation step may be accomplished through any well known coating or impregnation procedure. Included, without any limitation intended, within this step are dipping/padding, knife coat, spraying, roll coating, foam coating, and the like. The entire elastomer composition is impregnated within the textile fabric and subsequently heated. This heating step generates the acid and gels the surfactant which then uniformly coagulates the polyurethane latex over the entire substrate. The temperature required to initiate the reaction depends on the particular acid-generating compound utilized. However, in general, the requisite temperature should be at least 82° C. with a high temperature being about 130° C. The boiling point of water is the preferred temperature, particularly where a steam application, and most preferably a saturated steam (approximately 100° C.–110° C.) application, is utilized. Such conditions are preferred because moist heat (steam) provides the most effective exposure for the elastomer composition. The presence of moisture permits a greater level of control over the reaction since the addition of dry heat generally vaporizes the aqueous portion of the polyurethane latex which promotes the undesirable formation of a continuous polymer film. The latex must remain moist in order for proper and uniform coagulation to ensue. Therefore, the elastomer composition preferably must be heated and simultaneously must remain water-saturated during the entire reaction. Alternatively, the coated fabric may also be exposed to rapid heating by a microwave heat source which does not provide an appreciable loss of moisture to the overall elastomer composition. An exposure time of from about 10 seconds to about 1 minute, in a microwave application, or from about 1 minute to about 10 minutes, in a steam application, may be followed. A steam application for about 2 minutes is preferred. The utilization of a steam heating step again provides a distinct advantage over the prior art by retaining strictly aqueous solvent reaction conditions. After the steam heating step, the composite is dried with high convective, low temperature (<250° F.) heating or microwave heating in order to prevent continuous film formation on the fabric surface.

To the textile fabric there may be added, either before impregnation or after, preferably before, any standard textile additives, such as dyes, colorants, pigments, ultra violet absorbers, softening agents, soil redeposition agents, lubricating agents, antioxidants, flame retardants, rheology agents, and the like. Within the elastomer composition there may be incorporated any of the above-listed textile additives, as well as lubricating agents and cross-linking agents. One particularly desired an optional softening/soil redeposition/lubricating additive Lubril QCX™, available from Rhône Poulenc.

The inventive composite may be utilized within and/or as upholstery for furniture or in automobiles, as drapery, particularly as stage curtains, within napery and table linen application, within garments or apparel, or utilized as and/or for any other purpose in which a textile suede substitute is desired.

DETAILED DESCRIPTION OF THE PREFERRED EMBODIMENT

The preferred embodiment of the inventive method and composition is set forth in the following EXAMPLES.

Determination of Proportions on Coagulation and Quality of Composite

A first batch of polyurethane and water were mixed in equal proportions for further introduction of the preferred acid-generator and cloud point surfactant. The amounts of the two latter components were adjusted as exemplified below in order to determine the effect of such differing proportions of components had on the coagulability of the inventive composition within and on a textile fabric. The polyurethane latex was Witcobond™ W-293 (67% solids) from Witco, the heat-activated acid-generating chemical (acid-generator) was APTEX™ Donor H-plus from Applied Textile Technologies, and the cloud point surfactant was Cartafix U™ from Clariant. The test fabric was a preferred 100% polyester knit fabric, made from 1 dpf Dacron™ from Du Pont. This fabric was impregnated with the compositions of EXAMPLES 1–14, as noted below, then heated with steam at a temperature of about 102° C. (215° F.) for about 2 minutes. The degree of coagulation was then tested by rinsing the treated fabric in water, drying the fabric at about 121° C. (250° F.) for about 5 to about 7 minutes, and evaluating the aesthetics of the fabric qualitatively. (It is imperative that this drying step not be performed at a temperature above about 121° C. or for a period of time greater than about 10 minutes, as an undesired polymer film will develop under too high temperatures or at an acceptable temperature but for too long an exposure time.) The tested qualitative categories were coagulation and texture. Presented below, A means coagulated, B means no coagulation, C means partial coagulation, 1 means hard texture, and 2 means soft texture. The desired result was A 2, or, to a lesser degree C 2, with B, A 1, or C 1 being undesired. (Such a C 2 measurement is acceptable because partial coagulation will perform well in the intended applications as long as a washing step prior to drying is added and carefully controlled. Any uncoagulated latex is prone to easy removal, particularly during a sufficiently vigorous washing procedure.) One extra manner of testing of the coagulation category was testing the rinse water of the treated fabric. After the rinsing was completed, an indication of non-coagulation of the polyurethane latex on the fabric would exist if the rinse water was cloudy. Texture was measured empirically through a quick feel of the resultant composite. The EXAMPLES and results are presented in tabular form as follows:

TABLE 1

Examples 1–14 as indicated by amounts of components in the elastomer composition

| EX-AMPLE | Latex (g) | Water (g) | Acid-generator(g) | Surfactant(g) | Qualitatives |
|---|---|---|---|---|---|
| 1 | 100 | 100 | 10.0 | 10.0 | A 1 |
| 2 | 100 | 100 | 5.0 | 5.0 | A 1 |
| 3 | 100 | 100 | 2.5 | 10.0 | A 1 |
| 4 | 100 | 100 | 10.0 | 2.5 | A 1 |
| 5 | 100 | 100 | 2.5 | 5.0 | A 2 |
| 6 | 100 | 100 | 2.5 | 2.5 | A 2 |
| 7 | 100 | 100 | 2.5 | 2.0 | A 2 |
| 8 | 100 | 100 | 2.0 | 2.0 | A 2 |
| 9 | 100 | 100 | 1.0 | 2.5 | A 2 |
| 10 | 100 | 100 | 2.5 | 1.0 | C 2 |
| 11 | 100 | 100 | 1.0 | 1.0 | C 2 |
| 12 | 100 | 100 | 10.0 | 0.0 | C 1 |
| 13 | 100 | 100 | 2.5 | 0.0 | B |
| 14 | 100 | 100 | 0.0 | 0.0 | B |

From this data, it is clear that the amount of acid-generating chemical, cloud point surfactant, or both is crucial to providing a composite meeting optimum standards, at least depending on the amount of latex and where the amount of latex and water are equivalent. Too much of both components provides too hard a texture, too little gives only a partial coagulation, and the lack of one or both provides no coagulation at all.

Determination of Varying the Level of Latex and Water on Coagulation and Quality The same procedures were followed as for EXAMPLES 1–14, above, with the exception proportions of each component was altered to the levels as indicated in EXAMPLES 15–22, below. In this instance, however, the amounts of acid-generator and surfactant were always the same between the two components, thus placing the primary importance of performance on the level of latex and water within the elastomer composition. The same qualitative readings and criteria were followed as for EXAMPLES 1–14, above, also. The EXAMPLES and results are presented in tabular form as follows:

TABLE 2

Examples 15–22 as indicated by amounts of components in the elastomer composition

| EXAMPLE | Latex (g) | Water (g) | Acid-generator(g) | Surfactant(g) | Qualitatives |
|---|---|---|---|---|---|
| 15 | 100 | 100 | 2.50 | 2.50 | A 2 |
| 16 | 100 | 305 | 2.50 | 2.50 | A 2 |
| 17 | 100 | 715 | 2.50 | 2.50 | A 2 |
| 18 | 300 | 150 | 7.50 | 7.50 | A 2 |
| 19 | 20 | 320 | 0.50 | 0.50 | A 2 |
| 20 | 20 | 600 | 0.50 | 0.50 | A 2 |
| 21 | 100 | 50 | 2.50 | 2.50 | A 2 |
| 22 | 100 | 33 | 2.50 | 2.50 | A 2 |

From these results, it appears evident that the degree of coagulation performance is dependent on the relationship between the amount of latex as compared to the amount of acid-generating chemical as well as the amount of latex as compared to the amount of cloud point surfactant, as previously noted.

There are, of course, many alternative embodiments and modifications of the present invention which are intended to be included within the spirit and scope of the following claims.

What I claim is:

1. An elastomer composition comprising (i) a water-borne polyurethane latex;

(ii) a heat-activated acid-generating chemical selected from the group consisting essentially of at least one organic acid ester; and (iii) at least one cloud point surfactant.

2. The composition of claim 1 wherein (ii) is ethylene glycol diacetate.

3. The composition of claim 2 comprising (i) a water-borne polyurethane latex comprising
      (a) a polyurethane latex; and
      (b) water;

(ii) at least one organic acid ester heat-activated acid-generating chemical; and (iii) at least one cloud point surfactant; wherein
      the weight ratio of (i)(a) to (i)(b) is from about 1:30 to about 3:1;
      the weight ratio of (i)(a) to (ii) is from about 40:1 to about 100:1; and
      the weight ratio of(i)(a) to (iii) is from about 40:1 to about 100:1.

4. The method of claim 3 wherein the weight ratio of (i)(a) to (ii) is from about 40:1 to about 50:1; and the weight ratio of (i)(a) to (iii) is from about 40:1 to about 50:1.

* * * * *